July 16, 1929.　　　　O. J. FROCK　　　　1,721,213
PRESSURE EQUALIZING BRAKE APPLYING DEVICE
Filed April 17, 1928　　3 Sheets-Sheet 1
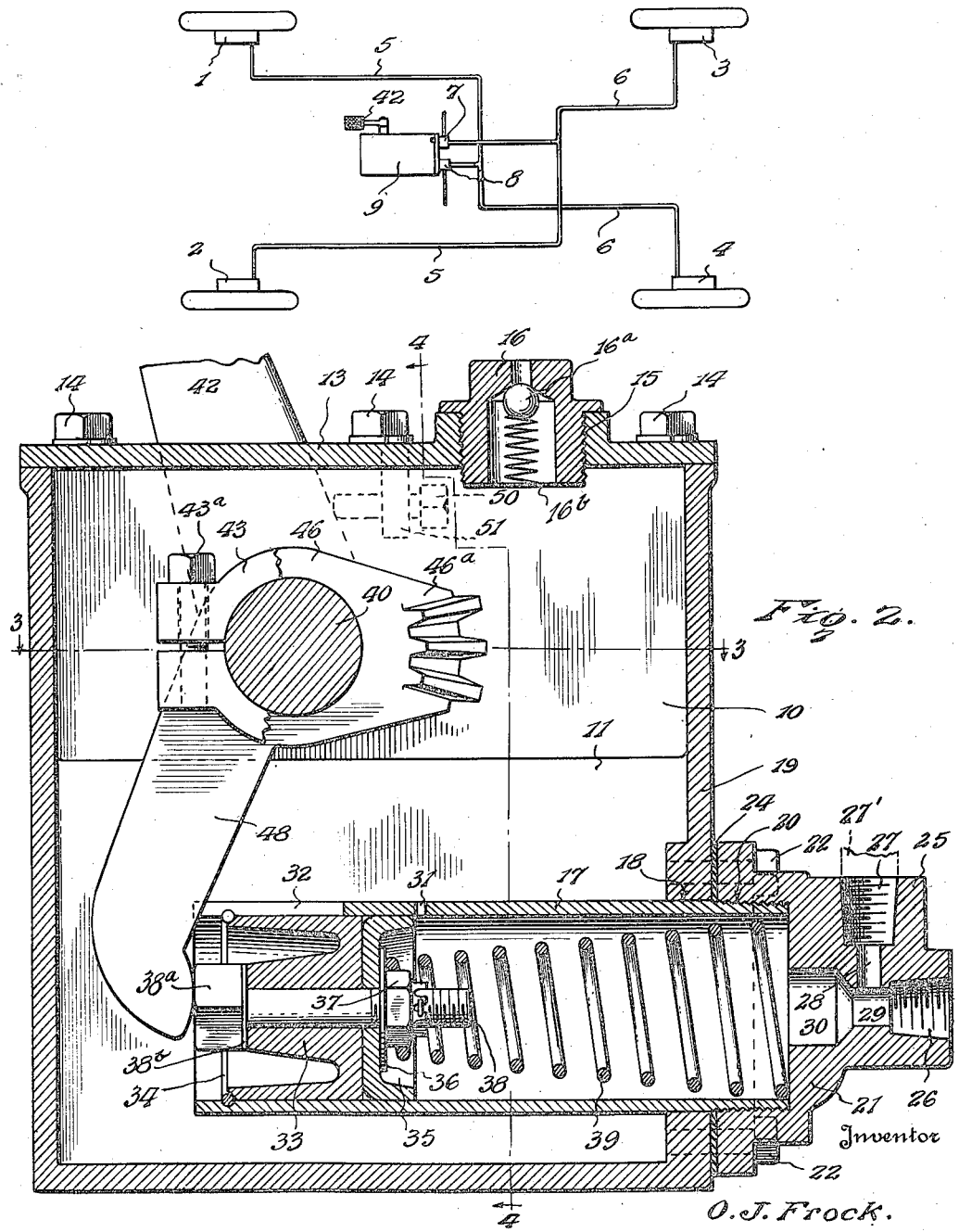

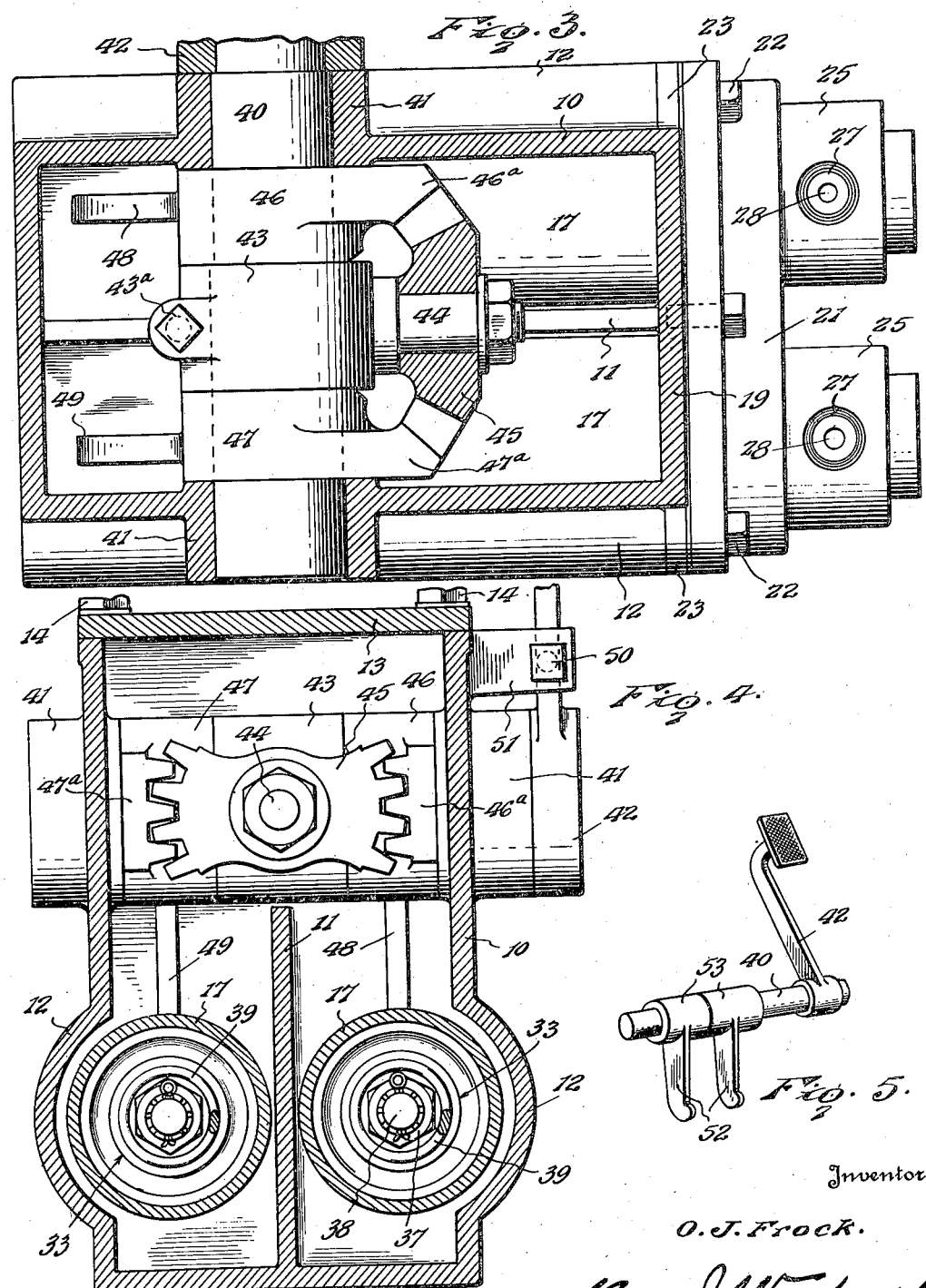

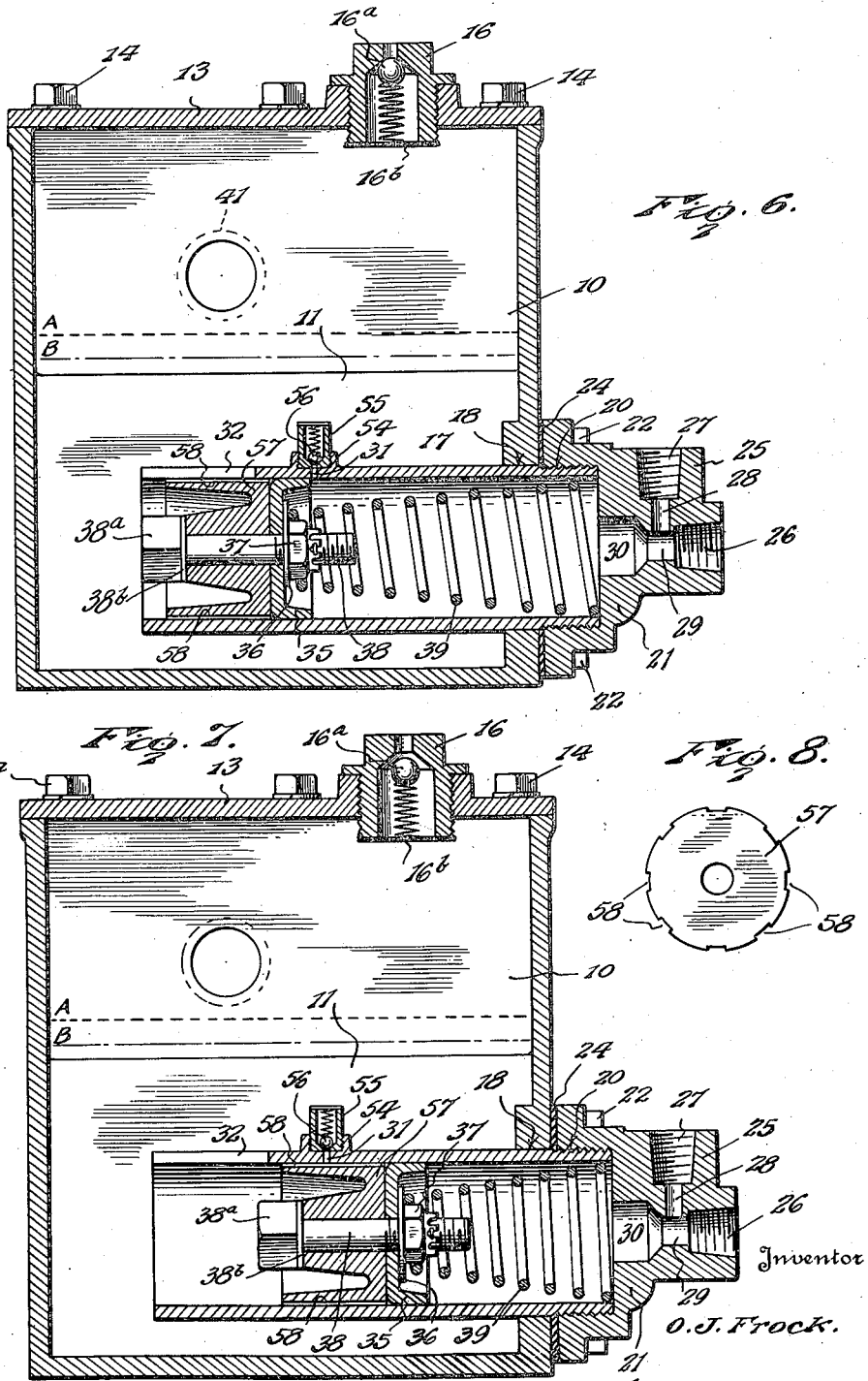

Patented July 16, 1929.

1,721,213

UNITED STATES PATENT OFFICE.

OSCAR J. FROCK, OF PHILADELPHIA, PENNSYLVANIA.

PRESSURE-EQUALIZING BRAKE-APPLYING DEVICE.

Application filed April 17, 1928. Serial No. 270,599.

This invention relates to a brake applying device and more particularly to a device by means of which pressure may be exerted upon brakes of the hydraulic type used upon automobiles and other vehicles.

One object of the invention is to provide brake applying means including a plurality of cylinders having brakes associated therewith and improved means for exerting pressure against pistons in the cylinders and equalizing the pressure in order that the brakes will be applied with equal force.

Another object of the invention is to provide pressure applying means in which the cylinders are mounted in a fluid container with which the cylinders communicate so that the fluid in the cylinders may be replenished if it should seep out of the cylinders or pipes leading therefrom to the brakes or in any other manner become diminished in volume.

Another object of the invention is to prevent the portion of the fluid container with which one cylinder communicates being emptied if a pipe leading from a second cylinder should become broken.

Another object of the invention is to provide a device of this character in which return of the pistons to a pressure releasing position will be assured and to prevent springs which return them to their pressure releasing positions from scoring the walls of the cylinders.

Another object of the invention is to so form the pressure applying apparatus that arms to engage the pistons will be disposed in the fluid reservoir where they and the cylinders will be shielded from dust and dirt and prevented from being damaged by stones and other objects thrown from a road by a rapidly moving automobile.

Another object of the invention is to mount the arms upon a shaft which serves not only as a carrier for the arms but also as a carrier for means to impart movement to the arms in an operative direction.

Another object of the invention is to provide common means to impart movement to the arms and allow the arms to have movement independent of each other when initially operated and thereby equalize pressure exerted upon the pistons.

Another object of the invention is to provide a device of this character which will be very compact in its construction and occupy a minimum amount of space and at the same time be very strong and durable.

An embodiment of the invention is illustrated in the accompanying drawings, wherein Figure 1 is a plan view showing the improved brake apparatus in diagram;

Fig. 2 is an enlarged vertical longitudinal sectional view through the fluid reservoir and one cylinder of the apparatus;

Fig. 3 is a sectional view taken horizontally through the reservoir on the line 3—3 of Fig. 2;

Fig. 4 is a vertical transverse sectional view taken on the line 4—4 of Fig. 2;

Fig. 5 is a perspective view illustrating a modified construction;

Fig. 6 is a vertical sectional view illustrating a modified cylinder construction, the mechanism for applying pressure to the pistons being omitted for sake of clearness;

Fig. 7 is a view similar to Fig. 6 showing the piston moved inwardly to a compressing position, and Fig. 8 is an end view of the piston.

The diagrammatic view in Fig. 1 illustrates a brake assemblage in which the front brakes 1 and 2 and rear brakes 3 and 4 are hydraulic brakes of a conventional construction. These brakes are connected in pairs by pipes 5 and 6 which lead from pressure cylinders 7 and 8 carried by a fluid reservoir 9, as will be more fully explained hereinafter, and from an inspection of the figure it will be seen that each pair of companion brakes includes brakes at opposite sides of the vehicle. Therefore, if only one pair of brakes are in operation, the braking action will always be at opposite sides of the vehicle and there will be no danger of skidding when the brakes are applied. While the pipes are shown leading from the cylinders to diagonally opposed brakes, it will be obvious that one cylinder could have its pipes connected with the front brakes and the pipes leading from the other cylinder connected with the rear brakes but the diagonal arrangement is preferable as the braking action will be applied to both front and rear wheels and a rapidly moving automobile can be checked without danger.

The cylinders 7 and 8 are mounted in the body 10 of the reservoir at opposite sides of a partition 11 and the side walls of the reservoir are bulged outwardly, as shown at 12, to accommodate them without unduly increasing its width throughout its entire depth. At its upper end the body is closed by a head or cover 13 removably secured by fasteners 14 and formed with a filling opening 15 through which oil or other fluid may be poured into the reservoir when the closure plug 16 is removed. An inwardly opening check valve 16a is provided in the cap to allow air to pass into the reservoir and a screen 16b at the inner end of the cap prevents foreign matter entering the reservoir.

Each cylinder consists of a tubular body 17 disposed longitudinally in the reservoir with one end portion fitting snugly in an opening 18 formed in the rear wall 19 thereof. The cylinders project outwardly from the rear wall 19 and each has its protruding end portion threaded and screwed into a socket 20 formed in a union 21 which extends across the lower portion of the rear wall, as shown in Figs. 2 and 3, and is removably secured by bolts 22 passed through upper and lower flanges of the union and screwed into ears 23 provided to receive them above and below the bulged portions 12 of the side walls 10 without the bolts extending through the wall of the reservoir. It will be obvious that the cylinders must be screwed into the sockets and then passed inwardly through the openings 18 until the union may be secured by the bolts. A gasket 24 is employed to insure a tight joint and prevent the fluid from leaking out of the cylinders. Necks 25 project from the union or coupling 21 and each is formed with a socket 26 to receive a pipe 5 or 6 and a socket 27 to receive a pipe 27' leading to a pressure gage (not shown) located upon the instrument board of the automobile where the operator can see it. The pipe 27' can be omitted and a plug screwed into the socket 27 to close it if so desired. The socket 27 has communication through a port 28 with a bore 29 leading from the socket 26 to a recess 30 constituting an extension of the socket 20. It will be readily seen that, when pressure is applied to fluid in the cylinders, the pressure will be transmitted through the pipes 5 and 6 to the brakes with which the cylinders are connected and as the pressure is equalized a very good braking action will be effected and the automobile brought to a stop without danger of skidding. The fluid is admitted to the cylinders through one or more openings 31 formed in spaced relation to the inner end of each cylinder and each cylinder is further provided with a slot 32 leading from its inner end.

In order to apply pressure to fluid in the cylinders, each cylinder carries a piston 33 which fits snugly therein for longitudinal sliding movement and is limited in its movement towards the open inner end of the cylinder by a resilient ring 34 seated in a groove formed adjacent the said open end of the cylinder. This piston carries a leather cup 35 held against its inner end by a washer 36 which in its turn is engaged by a nut 37 screwed upon a bolt 38 and from an inspection of Fig. 2 it will be seen that the bolt passes axially through the piston with its head 38a at the outer end of the piston bearing against a soft metal gasket 38b provided to prevent leakage about the bolt. Springs 39 are employed to yieldably retain the pistons in their normal position shown in Fig. 2 and taper towards the pistons so that they will not score the walls of the cylinders when moving into and out of pressure applying positions. It should be noted that the reduced ends of the springs fit closely about the nuts 37 and will thereby be retained in proper engagement with the pistons axially thereof. It should also be noted that the pistons when in an inoperative position are between the openings 31 and rings 34 and, therefore, fluid will be permitted to be drawn into the cylinders through the openings 31 and replenish the supply in the cylinders if it has become diminished by evaporation or slight leakage.

In order to impart movement to the pistons in an operative direction, there has been provided actuating means including a shaft 40 which extends transversely through the reservoir above the partition 11 and is rotatably mounted in bearings 41 carried by the side walls thereof. It should be noted that the shaft tapers slightly towards one end and at this end has a reduced end portion which projects outwardly from the adjacent bearing and carries an operating pedal 42 keyed or otherwise firmly secured upon the shaft. Since the pedal is rigidly secured upon the shaft close to the bearing and the shaft tapers towards the pedal, the shaft will be prevented from sliding longitudinally through the bearings. A clamp 43 is rigidly secured by the bolt 43a or in any other desired manner upon the shaft above the partition and from this clamp extends a stem 44 upon which is loosely mounted a gear 45 having teeth which mesh with cooperating teeth of arms 46a and 47a extending from collars 46 and 47 loose upon the shaft between the clamp and bearings. Levers 48 and 49 extend from the collars with their free ends terminating in front of the cylinders in position to bear against the heads 38a at the outer ends of the bolts 38 of the pistons. The levers are of such thickness that they may be received in the slots 32 of the cylinders and, therefore, they may have the necessary movement to force the pistons in an operative direction through the cylinders against the action of the springs 39.

When the brake is installed, the reservoir is secured in any desired manner to the chassis or other portion of an automobile and the pedal extends upwardly through a slot in the floor board where it may be easily engaged by the foot of the operator. When the pedal is pressed downwardly, the shaft is rotated and the gear 45 is swung circumferentially thereof. As the gear moves its teeth catch the teeth of the arms extending from the collars so that the collars will be turned to move the levers through the slots 32 and force the pistons in an operative direction. Since the gear is loose upon the stem 44, the levers may have movement independent of each other until the pressure of the two pistons against the fluid in the cylinders is equalized and they will then move together against the action of the springs and actuate the brakes at an equal pressure. Therefore, the braking action applied to the front and rear wheels will be equalized and the speed of an automobile very effectively checked and the automobile stopped without skidding. When pressure upon the pedal is released, the springs expand and move the pistons outwardly to the inoperative position in which position the openings 31 will be uncovered and fluid will be drawn through the openings by a partial vacuum in the cylinders to replenish fluid in the cylinders if additional fluid is required to keep the line full. The levers are acted upon by the pistons as they move outwardly and swing the pedal upwardly until its movement is stopped by engagement with a set screw 50 carried by an ear 51 which projects from a side wall of the reservoir. By adjusting the set screw any lost motion or rattle of the pedal may be controlled. The spring rings 34 must be engaged by the pistons before limit of movement of the pedal is stopped by set screw 50. During movement of the pistons towards an inoperative position, a partial vacuum will be created in the cylinders if replenishing of fluid in the cylinders is needed and when they pass the openings 31 fluid will be drawn from the reservoir to replace any which may have leaked out from the pipes or brakes during application of the brakes.

If a pipe leading from one cylinder should become broken, the fluid will drain out of the cylinder and the two brakes controlled thereby will be rendered inoperative but there will still be two operative brakes at opposite sides of the automobile and it can be effectively checked without danger of skidding. The partition between the cylinders will prevent the fluid from entirely draining out of the reservoir and, therefore, the cylinder which remains in operation will be kept full. It will be readily seen that the free play between the levers and gear carried by the clamp 43 will permit the levers to accommodate themselves to the conditions of the cylinders and equalize the pressure exerted upon the fluid contained therein or apply pressure upon fluid in one cylinder if the other has become emptied.

In Fig. 5, there has been illustrated a modified form of operating means. In this form of the invention the levers 52 extend from collars 53 which are keyed or otherwise firmly secured upon the shaft. When this form of construction is employed, the levers are not permitted to have movement independent of each other but when the levers and pedal are properly set the pistons will be moved together and the brakes all applied properly.

In Figs. 6, 7 and 8, there has been shown a reservoir having cylinders and pistons therein of a modified construction. The cylinders shown in these figures are of the same construction as those shown in Fig. 1, except that a socket 54 is provided about the opening 31 of each cylinder and into this socket is screwed a valve casing 55 having an outwardly opening valve 56 therein which is yieldably held in a closed position against the outer end of the opening 31. By this arrangement fluid will be prevented from passing through the openings 31 into the cylinders and if a pipe leading from one cylinder should break fluid in the reservoir will be prevented from draining out of the same through the opening into the cylinder and through the broken pipe onto the ground. The partition might be omitted when cylinders having the valves 55 are used but it is preferable to provide the same as an added element of safety. The piston 57 which is substituted for the piston 33 is similar in construction except that its peripheral face is formed with recesses 58 which extend longitudinally of the piston and provide passages through which fluid may pass into the cylinder while the piston is moving outwardly from the pressure applying or operative position shown in Fig. 7 to the inoperative position shown in Fig. 6.

When the construction shown in Figs. 6, 7 and 8 is used, the system is filled with fluid such as oil or water containing alcohol or the like to prevent freezing until the cylinders are filled and its level in the reservoir reaches approximately the line A—A. The plug is replaced and as the valve 16$^a$ is normally closed by its spring air will be prevented from passing outwardly through the port formed in the plug. When the pistons are initially forced inwardly to a pressure-applying position, the fluid follows the pistons into the cylinders through their open inner ends and the level of the fluid in the reservoir is lowered to the line B—B and at the same time air is drawn inwardly past the valve 16$^a$ which will have been moved downwardly to an open position. As soon as movement of the pistons in an operative direction ceases, the valve closes and air sucked in will be trapped in the upper portion of the reservoir and constitute a cushion which will prevent the fluid from returning to the level of the line A—A when the pistons return to their original positions and apply slight pressure to the fluid. The valve 16$^a$ also serves to prevent vapors arising from the anti-freezing substance from escaping through the port in the plug. As the pistons return to their inoperative position when pressure upon the treadle is relieved, fluid in the open end portions of the cylinders will pass through the grooves 58 past the cups 35 and the portions of the cylinders between the pistons and their outer ends will be kept filled. It should also be noted that if the fluid in the pipe lines and cylinders expand during warm weather it may force its way out of the cylinders through the openings 31 into the reservoir and thereby avoid danger of breaking the pipes. When the fluid cools and contracts, suction in the cylinders and pressure of the air cushion in the upper portion of the reservoir will cause the supply of oil in the cylinders to be replenished through the grooves in the pistons. After the initial movement of the pistons in an operative direction, the valve 16ª remains closed until the supply of fluid is diminished by gradual evaporation or leakage. It will thus be seen that the general mode of operation is quite similar to that of the form illustrated in Figs. 2, 3 and 4.

Having thus described the invention, I claim:

1. In a fluid brake, a reservoir, two cylinders in said reservoir having communication therewith, pipes to connect the cylinders each with a pair of brakes, a partition in the reservoir between said cylinders to retain fluid therein for one cylinder if fluid in the other cylinder is drained therefrom, and means in the reservoir for applying pressure to fluid in the cylinders.

2. In a fluid brake, a reservoir, cylinders in said reservoir having communication therewith, pipes to connect the cylinders with brakes to be operated, pistons slidable in said cylinders and normally in an inoperative position, a rotatable shaft extending through the reservoir, levers loose upon said shaft with their free ends disposed to engage said pistons, arms extending from said levers and having gear teeth provided thereon, a collar fast upon the shaft between said levers, a stem projecting radially from said collar, a gear loose upon said stem and having teeth meshing with the teeth of said arms to impart movement to the levers and force the pistons in a pressure exerting direction when the shaft is rotated, and means to rotate said shaft in an operative direction.

3. In a fluid brake, a reservoir, cylinders in said reservoir having communication therewith, pipes to connect the cylinders with brakes to be operated, pistons slidable in said cylinders and normally in an inoperative position, a rotatable shaft extending through the reservoir, levers loose upon said shaft with their free ends disposed to engage said pistons, and means fixed upon the shaft adapted to impart movement to the levers when the shaft is rotated in a pressure applying direction and force the pistons through the cylinders in a pressure applying direction, the levers being permitted limited independent movement whereby pressure upon the pistons may be equalized.

4. In a fluid brake, a reservoir, cylinders in said reservoir having outlets in their ends for pipes leading to brakes controlled thereby, pistons slidable in the cylinders towards and away from the outlet ends thereof, and actuating means including a rotatable shaft extending transversely of the cylinders through the reservoir, levers loose upon the shaft with their free ends disposed to bear against said pistons, means to rotate said shaft, and means fixed upon said shaft adapted to engage the levers to impart swinging movement thereto collectively and independently of each other and force the pistons towards the outer ends of the cylinders.

5. In a fluid brake, cylinders having outlets in their ends for pipes leading to brakes controlled thereby, pistons slidable in the cylinders towards and away from the outlet ends thereof, actuating means including a rotatable shaft extending transversely of the cylinders, levers loose upon the shaft with their free ends disposed to bear against said pistons, means to rotate said shaft, a collar fixed upon the shaft between the levers, arms extending from said levers and having gear teeth projecting transversely from the inner sides, a stem extending from said collar, and a gear loose upon said stem and having teeth meshing with the teeth of the arms to impart movement to the levers in a pressure applying direction when the shaft is rotated in one direction and allow limited independent movement of the levers to effect equalization of pressure exerted against the pistons.

6. In a fluid brake, a reservoir having a wall formed with openings spaced from each other transversely thereof, a coupling removably secured against said wall and formed with sockets opening through its inner face and registering with the openings in the wall, the sockets having outlet passages leading therefrom and adapted to receive pipes for conducting fluid to brakes, cylinders secured in the sockets of said coupling and extending through the openings into the reservoir, a partition in said reservoir between said cylinders, pistons slidable longitudinally in the cylinders, and actuating means in the reservoir including members to engage the pistons and force the same in a pressure applying direction.

7. In a fluid brake mechanism, a reservoir having a filling opening formed therein, a closure for the opening formed with a passage for admitting air into the reservoir, an inwardly opening control valve for the air passage yieldably held closed, a cylinder extending into said reservoir adjacent the bottom thereof and open at its inner end and adjacent its inner end formed with a side opening, a pipe leading from the outer end of the cylinder for connection with a fluid brake, a piston slidable longitudinally in the cylinder from between the side opening and inner end of the cylinder towards the outer end thereof to apply pressure upon fluid in the cylinder and pipe, and a valve carried by the cylinder in communication with the outer end of the side opening, the valve being yieldably held closed and adapted to be moved outwardly to an open position.

8. In a fluid brake mechanism, a reservoir having a filling opening formed therein, a closure for the opening formed with a passage for admitting air into the reservoir, an inwardly opening control valve for the air passage yieldably held closed, a cylinder extending into said reservoir adjacent the bottom thereof and open at its inner end and adjacent its inner end formed with a side opening, a pipe leading from the outer end of the cylinder for connection with a fluid brake, a piston slidable longitudinally in the cylinder from between the side opening and inner end of the cylinder towards the outer end thereof to apply pressure upon fluid in the cylinder and pipe, the piston having a cup at its inner end and having its body portion formed with passages to admit fluid into the cylinder, and a valve carried by the cylinder in communication with the outer end of the side opening, the valve being yieldably held closed and adapted to be moved outwardly to an open position.

In testimony whereof I affix my signature.

OSCAR J. FROCK. [L. S.]